United States Patent [19]
Moretti

[11] Patent Number: 5,690,254
[45] Date of Patent: Nov. 25, 1997

[54] DEVICE FOR OPERATING PUMPS IN AN INSTALLATION FOR THE FOAMING OF POLYURETHAN

[76] Inventor: Bruno Moretti, Via F. 11i Bronzetti, 4, I 27029 Vigevano, Italy

[21] Appl. No.: 503,487

[22] Filed: Jul. 18, 1995

[30] Foreign Application Priority Data

Aug. 8, 1994 [IT] Italy ................... PV940006 U

[51] Int. Cl.⁶ ........................................... B67D 5/52
[52] U.S. Cl. .................. 222/135; 222/333; 222/383.1
[58] Field of Search ........................ 222/333, 383.1, 222/135

[56] References Cited

U.S. PATENT DOCUMENTS

| | | | |
|---|---|---|---|
| 1,880,857 | 10/1932 | Davis | 22/333 X |
| 2,169,514 | 8/1939 | Buzzard | 222/333 X |
| 2,777,610 | 1/1957 | Fox et al. | 222/135 X |
| 3,081,909 | 3/1963 | Hooker | 222/135 X |
| 3,633,795 | 1/1972 | Brooks | 222/135 X |
| 3,680,784 | 8/1972 | Fakes | 222/135 X |
| 5,439,147 | 8/1995 | Bitschnau | 222/333 |

Primary Examiner—Richard E. Gluck
Attorney, Agent, or Firm—Watson Cole Stevens Davis

[57] ABSTRACT

A device for operating pumps in an installation for the foaming of polyurethan comprising two vertical tanks each containing a component for obtaining polyurethan, a pump provided on the lower part of each tank to pump the material from said tank towards a mold for foaming, a shaft passing vertically through each tank, a pump connected to one end of said shaft, a plate for covering the tops of said tanks, the other end of said shaft passing through said plate, and means attached to said other end of each of said shaft and connected one to the other by which said pumps are driven.

15 Claims, 2 Drawing Sheets

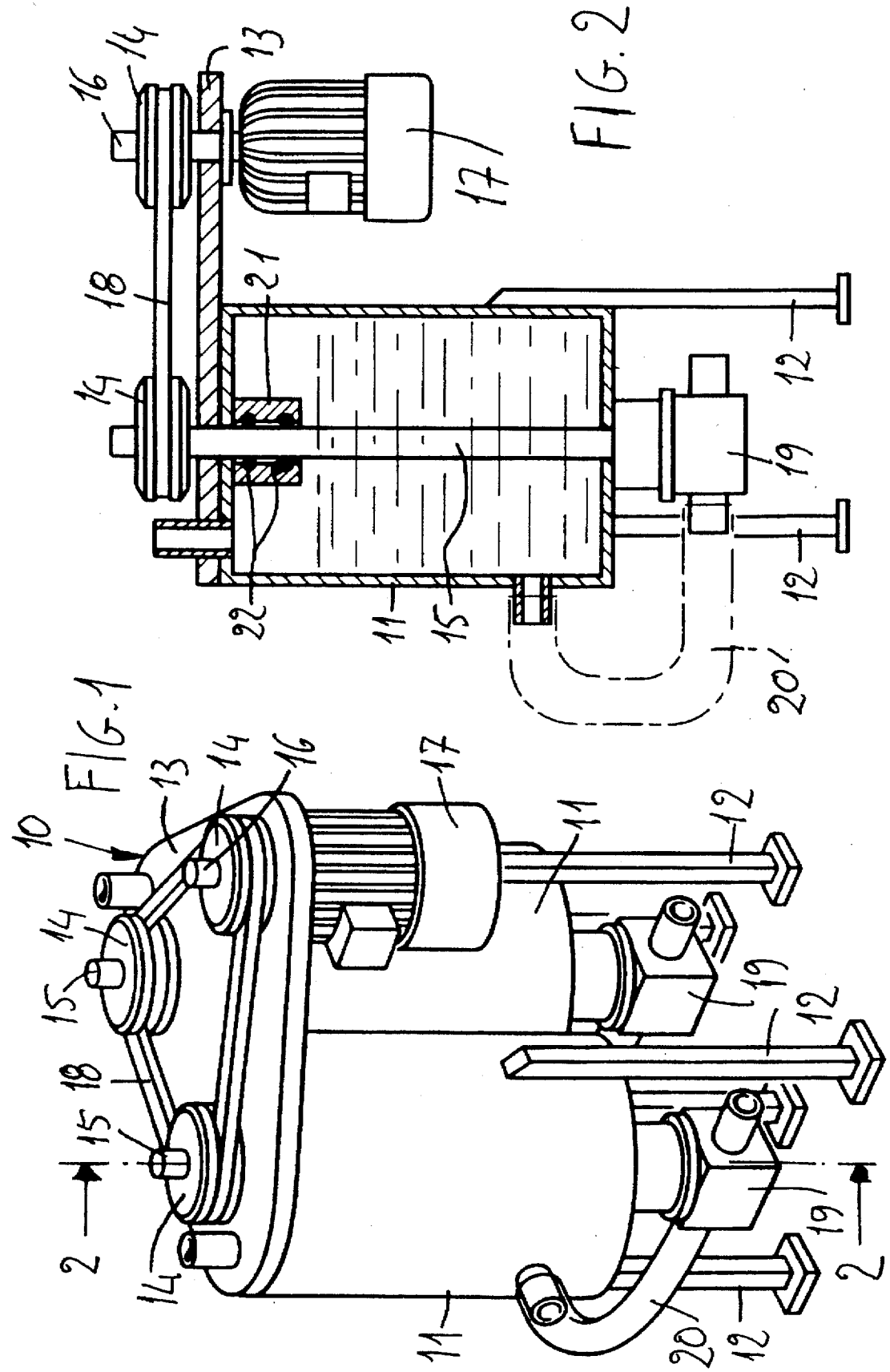

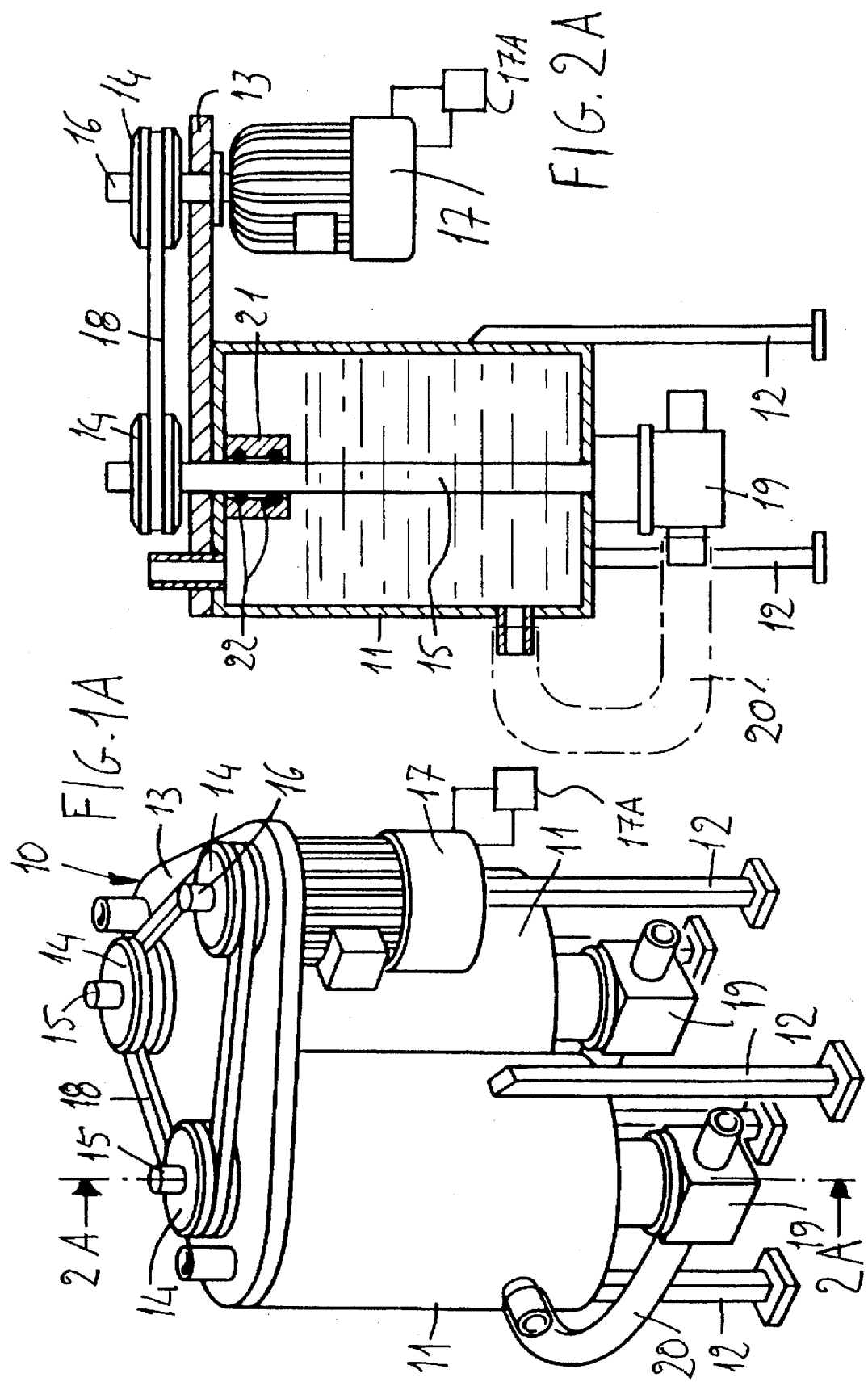

DEVICE FOR OPERATING PUMPS IN AN INSTALLATION FOR THE FOAMING OF POLYURETHAN

The present invention relates to a device for operating pumps in an installation for the foaming of polyurethan, also known as polyurethane.

In installations of this type, two pumps are provided for drawing diisocyanate and glycol from the tanks and transferring them into a mold. These materials, which are contained in two different tanks, are injected to obtain the foaming of the polyurethan.

Between the motor shaft and each pump there is a packing which comes in contact with these materials and is corroded on account of corrosive crystal herein contained in the materials.

This corrosion action occurs speedly enough and requires the replacement of the packings at least once a month. This operation needs a considerable loss of time as the diassembling of the connecting parts between the pumps and the motor shaft presents some difficulties. This encreases the cost of the product obtained by means of the foaming of polyurethan.

It is the purpose of the present invention to overcome the above described drawbacks.

The technical problem to be solved was to drive the pumps prevent the liquids contained in the tanks from contacting the packings to damage the packings cause their frequent replacement.

The solution of the technical problem is characterized by the fact that each pump is connected to one end of a shaft placed inside the tanks containing the materials used to obtain the foaming of the polyurethan. The other end of said shaft piercing a plate closing the top of said tanks. The shafts being connected one to the other by means adapted to drive said pumps.

Further characteristics and advantages will be more clearly apparent from the following description and from the enclosed drawing in which:

FIG. 1 is a perspective view of the device applied to an installation for foaming polyurethan; and FIG. 1A is a perspective view of the device of FIG. 1 modified to include a transducer; and FIG. 2 is a sectional view taken along line 2—2 of FIG. 1.

FIG. 2A is a sectional view along line 2A—2A of FIG. 1A.

With reference to FIG. 1 device has been generically indicated by 10 for foaming the polyurethan formed by two vertical tanks 11 each containing one of the two materials for obtaining the polyurethan. The tanks are kept in position by support feet 12.

The upper part the tanks 11 are closed by a triangle-shaped plate 13 presenting a pulley 14 in the proximity of each apex. Two of said pulleys are connected to vertical shafts 15 which transgress internally the tanks 11 and come out of the upper part of said plate 13. The third pulley is connected to the shaft 16 of a DC electric motor 17.

The pulleys 14 are connected by means of a belt or chain 18 in such a way that, when the electric motor is started, the vertical shafts 15 are started; in this way the liquid components contained in the tanks are shaken for obtaining a homogeneous amalgam.

The pulleys 14 are fixed to an end of the vertical shafts 15. The other end of said shafts 15 is connecetd to a pump 19 placed below the lower end of the tanks 11. The two pumps 19, one each tank, are of variable delivery and, when started, they suck the contents of the tanks 11 through the ducts 20 in order to convey them towards the foaming mold.

Each shaft 15 (FIG. 2) is supported on the upper part of the tank by a support 21. Two packings 22 are placed between said support 21 and the shaft 15.

The pumps 19 are positioned in strict contact with the tank, so that incidental particles do not corrode the packings 22 which are placed on the upper part of the tank 11, out of contact with the material contained therein.

The packings 22 and the pumps 19 are positioned in order and keep the material liquid, to obtain the foaming of the polyurethan under pressure.

The description has illustrated a driving device with pumps 19 where said pumps are of a fixed delivery type, but it is an object of the solution comprise vertical shafts 15 driven by a DC motor, as a consequence two pumps of fixed delivery type are provided.

The DC motors also may be provided with transductors e.g., transductor 17A, shown in FIGS. 1A and 1B so that the pumps driven by said motors may result in a variable delivery type.

This is necessary because the relation between the two materials necessary to obtain the foaming may vary depending on the necessity to obtain a more or less intense foaming of polyurethan.

I claim:

1. A device for operating pumps in an installation for the foaming of polyurethan comprising two vertical tanks each containing a component for obtaining polyurethan, a pump provided on the lower part of each tank to pump the material from said tank towards a mold for foaming, a shaft passing vertically through each tank, a pump connected to one end of each shaft, a plate for covering the tops of said tanks, the other end of each shaft passing through said plate, and means attached to said other end of each of said shaft by which said pumps are driven.

2. The device according to claim 1, wherein said means comprises an electric motor, pulleys fixed to said shafts, a driving element connecting said pulleys and said motor, said electric motor fixed to said plate to drive said pulley, the continuous rotation of said shafts inside said tanks permitting generation of homogeneous amalgam of the material.

3. The device according to claim 1, including a support in each tank attached to a top thereof for supporting each shaft, said support having packing and, said support and packing being out of contact with said material in said tank.

4. The device according to claim 1, wherein said means comprises an electric motor, pulleys fixed to said shafts, a driving element connecting said pulleys and said motor, wherein said driving element connecting said pulleys to said motor is a belt.

5. The device according to claim 1, wherein said pumps are of the variable delivery type.

6. A device for operating pumps in an installation for the foaming of polyurethan, comprising two vertical tanks each containing a component material for obtaining polyurethan, a pump provided on the lower part of each tank to pump the material from said tank towards a mold for foaming, a shaft passing through each tank, each pump connected to one end of one shaft, a plate covering the top of both tanks, the other end of each one shaft piercing said plate and means connected to said ends of each of said shafts for driving said shafts and as a consequence driving said pumps.

7. The device according to claim 6, wherein said means provided for each of said shafts includes a DC motor of the fixed delivery type.

8. The device according to claim 6, wherein said means provided for each of said shafts include a DC motor provided with a transductor to vary the rate of delivery of said pumps.

9. The device according to claim 2, including a support in each tank attached to a top thereof for supporting said shaft, said support having packing and, said support and packing being out of contact with said material in said tank.

10. The device according to claim 2, wherein said driving element connecting said pulleys to said motor is a belt.

11. The device according to claim 3, wherein said means comprises an electric motor, pulleys fixed to said shafts, a driving element connecting said pulleys and said motor, wherein said driving element connecting said pulleys to said motor is a belt.

12. The device according to claim 2, wherein said pumps are of the variable delivery type.

13. The device according to claim 3, wherein said pumps are of the variable delivery type.

14. The device according to claim 4, wherein said pumps are of the variable delivery type.

15. The device according to claim 7, characterized by the fact that said DC motors are provided with transductors to vary the rate of deliver of said pumps.

* * * * *